US011528095B2

(12) United States Patent
Arulappan et al.

(10) Patent No.: US 11,528,095 B2
(45) Date of Patent: Dec. 13, 2022

(54) METHODS TO REMOVE DRIBBLE INTRODUCED AND REGENERATE SYNC BITS LOST DUE TO SQUELCH DELAYS IN USB HIGH SPEED PACKET REPEATING

(71) Applicant: Cypress Semiconductor Corporation, San Jose, CA (US)

(72) Inventors: Godwin Gerald Arulappan, Sunnyvale, CA (US); Pradeep Kumar Bajpai, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 187 days.

(21) Appl. No.: 17/119,903

(22) Filed: Dec. 11, 2020

(65) Prior Publication Data

US 2022/0190960 A1 Jun. 16, 2022

(51) Int. Cl.
*H04L 1/00* (2006.01)
*H04L 12/403* (2006.01)
*H04L 43/0829* (2022.01)
*H04L 69/22* (2022.01)
*H04L 47/32* (2022.01)
*H04B 3/58* (2006.01)

(52) U.S. Cl.
CPC ............ *H04L 1/0083* (2013.01); *H04B 3/58* (2013.01); *H04L 1/0061* (2013.01); *H04L 12/403* (2013.01); *H04L 43/0829* (2013.01); *H04L 47/32* (2013.01); *H04L 69/22* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 2014/0006655 A1* | 1/2014 | Chan | G06F 1/3209 710/16 |
| 2014/0006664 A1* | 1/2014 | Chen | G06F 13/4072 710/106 |
| 2016/0162427 A1* | 6/2016 | Kang | G06F 13/387 710/313 |
| 2018/0173666 A1* | 6/2018 | Srivastava | G06F 13/36 |
| 2018/0189222 A1* | 7/2018 | Srivastava | G06F 13/287 |
| 2018/0336160 A1* | 11/2018 | Fukumoto | G06F 13/4068 |
| 2019/0042521 A1* | 2/2019 | Chen | G06F 13/36 |
| 2020/0034323 A1* | 1/2020 | Maung | H04B 3/36 |
| 2022/0190960 A1* | 6/2022 | Arulappan | H04L 1/0061 |

* cited by examiner

*Primary Examiner* — Otis L Thompson, Jr.

(57) ABSTRACT

Disclosed are techniques for removing dribble bits following the end-of-packet (EOP) of a High-Speed data packet inserted by the transmission envelope detector of a repeater/hub that interconnects electronic devices compliant with Universal Serial Bus (USB) Specification Revision 2.0 or higher. A physical layer logic (PHY) of a first port of the repeater/hub receives a High-Speed data packet to store a recovered bit stream into an elastic buffer. The recovered bit stream may include dribble bits inserted by the PHY after the EOP. The repeater/hub reads the recovered bit stream from the elastic buffer for transmission through the PHY of a second port. The repeater/hub monitors the EOP. When the EOP is detected, the repeater/hub prevents transmission of the dribble bits of the recovered bit stream following the EOP from the second port, eliminating the intended receiver of the High-Speed data packet from the complexity of dealing with dribble bits.

20 Claims, 8 Drawing Sheets

METHODS TO REMOVE DRIBBLE INTRODUCED AND REGENERATE SYNC BITS LOST DUE TO SQUELCH DELAYS IN USB HIGH SPEED PACKET REPEATING

TECHNICAL FIELD

This disclosure generally relates to Universal Serial Bus (USB) systems, and more particularly, to methods and systems to correct USB high-speed packets corrupted by USB repeaters due to squelch delays.

BACKGROUND

Various electronic devices (e.g., such as smartphones, tablets, notebook computers, laptop computers, hubs, chargers, adapters, etc.) are configured to communicate data or transfer power through a Universal Serial Bus (USB) connector system. Devices of a USB system may communicate at various data rates. In some applications, a repeater device in a USB hub is used to connect a mix of devices operating at different data rates to a host. The repeater device, or simply a repeater, may receive a USB packet transmitted from a host at a higher data rate and may retransmit the USB packet at the same or a lower data rate to one or more downstream devices. For USB system operating at High Speed with a maximum data rate of 480 Mbits per second (Mb/s) under USB Specification Revision 2.0, a transmission envelope detector in the repeater may detect the presence of a differential voltage on the pair of differential data lines D+ (or DP) and D− (or DM) to indicate the presence of a High-Speed data packet.

A High-Speed data packet begins with a 32-bit synchronization sequence followed by the payload of the packet and terminated by an 8-bit end-of-packet pattern. The synchronization sequence, or SYNC, enables the transmission envelope detector to perform clock and data recovery to lock to the bit stream of the data packet. The transmission envelope detector may produce a 'squelch' signal to indicate no data if there is less than 100 uV between the data lines. Due to the inherent delays in the transmission envelope detector, the repeater may lose bits at the beginning of the SYNC (SYNC bit loss) and may insert additional bits (dribble bit addition) following the end-of-packet (EOP). The USB 2.0 specification allows for the loss of up to 4 SYNC bits and the addition of 4 dribble bits. Due to intervening repeaters (e.g., as part of hubs) between the host and a device, the intended receiving downstream device (or receiver) of the packet may see only 12 SYNC bits and up to 20 dribble bits. As a result, the intended receiver has to be able to lock to the input bit stream within the 12 SYNC bits of a High-Speed data packet. The intended receiver also has to be able to ignore the dribble bits to avoid interpreting them as a new packet. The extra processing requirement increases the complexity and cost of the receiver.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
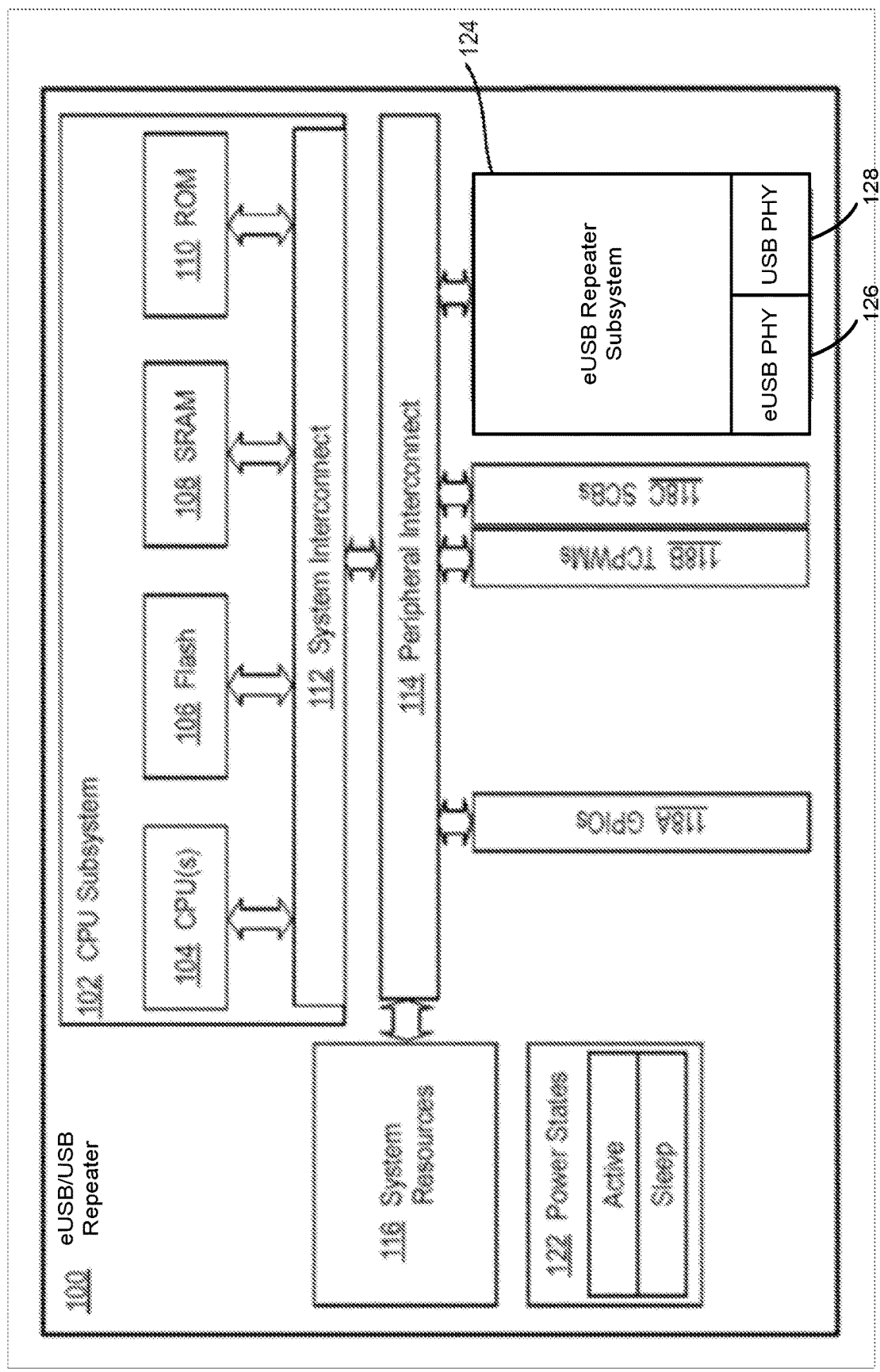
FIG. 1 is a block diagram that illustrates a repeater device (or simply a repeater) of a USB subsystem, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Described herein are various aspects of techniques for removing dribble bits following the end-of-packet (EOP) of a High-Speed data packet or regenerating bits of the synchronization sequence (SYNC bits) of the High-Speed data packet in a repeater (e.g., as part of a docking station or hub) that interconnects electronic devices compliant with Universal Serial Bus (USB) Specification Revision 2.0 or higher. Examples of such electronic devices include, without limitation, personal computers (e.g., laptop computers, notebook computers, and so forth), mobile computing devices (e.g., tablets, tablet computers, e-reader devices, and so forth), mobile communication devices (e.g., smartphones, cell phones, personal digital assistants, messaging devices, pocket PCs, and so forth), connectivity and charging devices (e.g., hubs, docking stations, adapters, chargers, etc.), audio/video/data recording and/or playback devices (e.g., cameras, voice recorders, hand-held scanners, monitors, and so forth), and other similar electronic devices that can use USB connectors (interfaces) for communication and/or battery charging.

As used herein, an electronic device or a system is referred to as "USB-enabled" or "USB-compliant" if the electronic device or system complies with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, and so forth) of a differential serial bus that are required to design and build standard communication systems and peripherals.

For example, a USB-enabled peripheral electronic device attaches to a USB-enabled host device through a USB port of the host device to form a USB-enabled system. A USB 2.0 (or simply USB2) port may include a power line (e.g. $V_{BUS}$) of 5V, a differential pair of data lines (e.g., which may be denoted D+ or DP, and D− or DN), and a ground line (e.g., GND) for power return. A USB 3.0 port also provides the $V_{BUS}$, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (e.g., which may be denoted DPWR), and a ground line for power return (e.g., which may be denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, was recently defined in various releases of the USB Type-C specification. The various releases of the USB Type-C specification define USB Type-C receptacle, plug, and cables that can support USB communications as well as power delivery over newer USB power delivery protocols defined, for example, in one or more revisions USB Power Delivery (USB-PD) specifications.

Some electronic devices may be compliant with a specific release and/or version of the USB Type-C specification. As used herein, a "USB Type-C subsystem" may refer to, for example, hardware circuitry that may be controllable by firmware and/or software in an integrated circuit (IC) controller, which is configured and operable to perform the functions and to satisfy the requirements specified in at least one release of the USB Type-C specification. Examples of such Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, and so forth. According to the USB Type-C specification(s), a Type-C port provides VBUS, D+, D−, GND, SSTX+, SSTX−, SSRX+, and SSRX− lines, among others.

Some electronic devices may use a low-voltage USB 2.0 interface optimized for power compliant with the eUSB2 Physical Layer Specification (e.g., Revision 1.1 or later), Supplement to USB 2.0, referred to as embedded USB (eUSB or eUSB2). eUSB uses 1.2 V signaling to decouple external USB 2.0 and/or USB Type-C ports from internal components of electronic devices that are fabricated with lower technology nodes running at lower voltages. A High-Speed repeater between a USB-enabled host device and a USB-compliant electronic device may convert between signaling using the eUSB and USB 2.0 standards.

A USB-compliant electronic device may be connected to a USB-enabled host device through one or more hubs to form a USB-enabled system. The device may exchange data packets with the host and receive power from the host through the one or more hubs using USB 2.0 and/or USB Type-C ports. A hub allows the host to connect the host to a mix of devices operating at different data rates. A repeater in the hub may receive a USB packet transmitted from the host at a higher data rate and may retransmit the USB packet at the same or a lower data rate to the devices. Under USB 2.0, the USB-enabled system is capable of operating at a High-Speed (HS) rate with a maximum date rate of 480 Mbits per second (Mb/s). The devices may fall back to the Full-Speed (FS) rate of 12 Mb/s or the Low-Speed (LS) rate of 1.5 Mb/s of USB 1.0 if necessary. A USB 2.0 compliant repeater may support re-timing functionality for High-Speed, Full-Speed, and Low-Speed.

FIG. 1 is a block diagram that illustrates a repeater 100 of a USB subsystem, in accordance with one aspect of the present disclosure. Such USB subsystem may be implemented as part of, and/or within, a USB-enabled system such as a USB2.0 hub or a USB2.0 docking station. The repeater 100 may be embedded in an integrated circuit (IC) controller chip manufactured on an IC die, such as an IC controller chip of a USB hub. In another example, the repeater 100 may be a single-chip IC that is manufactured as a System-on-Chip (SoC). The repeater 100 may be a eUSB/USB repeater that performs the repeating functionality between an embedded USB2 (eUSB2) port compliant with the eUSB2 Physical Layer Specification 1.1, Supplement to USB 2.0 and a USB2 port compliant with USB 2.0. In another example, the repeater 100 may perform the repeating functionality between two USB2 ports.

Among other components, repeater 100 may include CPU subsystem 102, system interconnect 112, peripheral interconnect 114, system resources 116, various input/output (I/O) blocks (e.g., 118A-118C), and eUSB repeater subsystem 124. In addition, repeater 100 may provide circuitry and firmware that is configured and operable to support a number of power states 122. The CPU subsystem 102 may include one or more CPUs (central processing units) 104, flash memory 106, SRAM (Static Random Access Memory) 108, and ROM (Read Only Memory) 110 that are coupled to system interconnect 112. CPU 104 is a suitable processor that can operate in a system-on-chip device. In some embodiments, CPU 104 may be optimized for low-power operation with extensive clock gating and may include various internal controller circuits that allow CPU 104 to operate in various power states.

For example, CPU 104 may include a wake-up interrupt controller that is configured to wake CPU 104 from a sleep state, thereby allowing power to be switched "OFF" when the repeater 100 is in the sleep state. Flash memory 106 can be any type of program memory (e.g., NAND flash, NOR flash, and so forth) that is configurable for storing data and/or programs. SRAM 108 can be any type of volatile or non-volatile memory that is suitable for storing data and firmware/software instructions accessed by CPU 104. ROM 110 can be any type of suitable storage that is configurable for storing boot-up routines, configuration parameters, and other system-on-chip firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks (e.g., 118A-118C), and eUSB repeater subsystem 124. The peripheral interconnect 114 may include various controller circuits (e.g., direct memory access, or DMA controllers), which may be programmed to transfer data between peripheral blocks without burdening the CPU subsystem. In various embodiments, each of the components of the CPU subsystem 102 and the peripheral interconnect 114 may be different with each choice or type of CPU, system bus, and/or peripheral bus.

System resources 116 may include various electronic circuits that support the operation of repeater 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem of system resources 116 may also include circuits that allow repeater 100 to draw and/or provide power from/to external sources with several different voltage and/or current levels. System resources 116 may also include a clock subsystem that provides various clocks that are used by repeater 100, as well as circuits that implement various controller functions such as external reset.

An IC controller, such as repeater 100, may include various different types of I/O blocks and subsystems in various embodiments and implementations. For example, in the embodiment illustrated in FIG. 1, repeater 100 may include GPIO (general purpose input output) blocks 118A, TCPWM (timer/counter/pulse-width-modulation) blocks 118B, SCBs (serial communication blocks) 118C, and eUSB repeater subsystem 124. GPIOs 118A include circuits configured to implement various functions such as, for example, pull-ups, pull-downs, input threshold select, input and output buffer enabling/disabling, multiplex signals connected to various I/O pins, etc. TCPWMs 118B include circuits configured to implement timers, counters, pulse-width modulators, decoders and various other analog/mixed signal elements that are configured to operate on input/output signals. SCBs 118C include circuits configured to implement various serial communication interfaces such as, for example, I²C, SPI (serial peripheral interface), UART (universal asynchronous receiver/transmitter), and so forth.

In certain embodiments, the eUSB repeater subsystem 124 may be utilized in accordance with the techniques described herein, and may also provide support for USB communications over USB ports, as well other USB functionality such as power delivery and battery charging. For example, eUSB repeater subsystem 124 may be a USB-PD subsystem, a USB Type-C subsystem, or both (e.g., a USB Type-C subsystem that supports USB-PD functionality). eUSB repeater subsystem 124 may include a transceiver and physical layer logic (PHY) 126, 128 for eUSB2 and USB 2.0, respectively, which are configured as integrated baseband PHY circuits to perform various digital encoding/decoding functions (e.g., Biphase Mark Code-BMC encoding/decoding, cyclical redundancy checks-CRC, and so forth) and analog signal processing functions involved in physical layer transmissions. The eUSB repeater subsystem 124 may be referred to as a eUSB re-timing repeater. In various embodiments, a repeater (e.g., such as eUSB repeater subsystem 124) may be implemented as hardware logic that includes various components such as logic gates, adders, multiplexers, latches, flip-flops, counters, registers, transistors, diodes, resistors, capacitors, and various circuits thereof. As will be further discussed below, the eUSB repeater subsystem 124 may include circuitry to remove dribble bits following the EOP of a High-Speed data packet or to regenerate bits of the SYNC bits of the High-Speed data packet. While aspects of the disclosure will be illustrated using High-Speed data packets received from the eUSB PHY 126 for transmission through the USB PHY 128, the operations to remove dribble bits and regenerate lost SYNC bits are equally applicable to High-Speed data packets received from the USB PHY 128 for transmission through the eUSB PHY 126.

Figure 2:
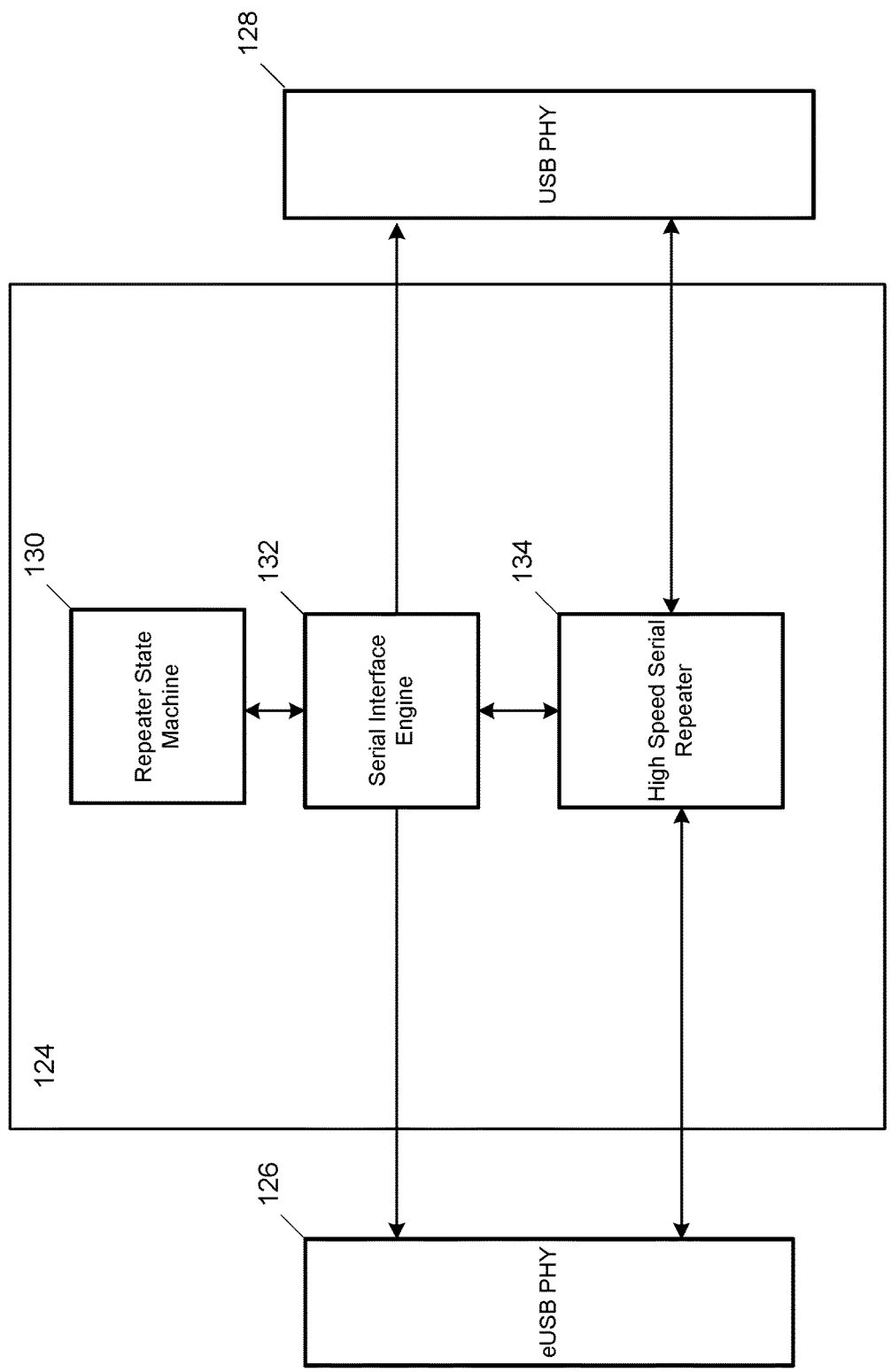
FIG. 2 is a block diagram that illustrates the eUSB repeater subsystem of FIG. 1 used to repeat High-Speed data packets between an embedded USB2 (eUSB2) port and a USB2 port, in accordance with one aspect of the present disclosure.

FIG. 2 is a block diagram that illustrates the eUSB repeater subsystem 124 of FIG. 1 used to repeat High-Speed data packets between an embedded USB2 (eUSB2) port and a USB2 port, in accordance with one aspect of the present disclosure. The eUSB repeater subsystem 124 may include a High-Speed serial repeater 134 configured to perform re-timing and repeating functionality of the High-Speed data packets, a serial interface engine 132 configured to detect events on the eUSB2 and USB2 ports, and a repeater state machine configured to determine states of the High-Speed serial repeater 134 based on the detected events. The eUSB repeater subsystem 124 may be connected to the eUSB2 port and the USB2 port through the eUSB PHY 126 and USB PHY 128, respectively.

The eUSB PHY 126 may be connected to a host or an intervening hub/repeater to receive High-Speed data packets transmitted from the host through a differential pair of data lines DP and DM. The USB PHY 128 may be connected to a device or an intervening hub/repeater to retransmit the High-Speed data packets at the same or lower data rate to the device through a second differential pair of data lines DP and DM. For data from the device to the host, the USB PHY 128 may receive High-Speed data packets transmitted from the device and the eUSB PHY 126 may retransmit the High-Speed data packets at the same or lower data rate to the host. The eUSB PHY 126 and USB PHY 128 may each include a transmission envelope detector (e.g., implemented as hardware logic) to perform clock and data recovery (CDR) function to lock to the SYNC bits of the received data packets. The transmission envelope detector may produce a squelch signal to indicate no data if there is less than 100 uV between a differential pair of data lines. Due to the inherent delay in the transmission envelope detector, also referred to as the squelch delay, the eUSB PHY 126 and USB PHY 128 may lose up to four bits at the beginning of the SYNC bits and may insert up to four dribble bits following the EOP.

The High-Speed serial repeater 134 may include circuitry to prevent loss of the SYNC bits by regenerating the lost SYNC bits to transmit a programmable number of SYNC bits up to its full complement at the output of the eUSB repeater subsystem 124. An elastic buffer such as a first-in first-out (FIFO) buffer may store data received by the eUSB PHY 126 or USB PHY 128 when the transmission envelope detector detects the bit stream of a High-Speed data packet. When the elastic buffer reaches its half depth or a pre-configured threshold, the SYNC bits may be serially read out. For each SYNC bit read out of the elastic buffer, a SYNC bit is transmitted. If the end of the SYNC is read before the programmable number of SYNC bits have been transmitted, the High-Speed serial repeater 134 may halt the elastic buffer read. The High-Speed serial repeater 134 may proceed to generate and transmit additional SYNC bits until the programmable number of SYNC bits are transmitted. The read out of the elastic buffer may then resume to transmit the rest of the High-Speed data packet starting from the payload.

The High-Speed serial repeater 134 may also include circuitry to prevent the addition of dribble bits after the EOP by stripping off the dribble bits before transmission. When the bits read out of the elastic buffer indicate the EOP, High-Speed serial repeater 134 may disable transmission of the dribble bits for a pre-determined number of bits. When the transmission envelope detector detects active data, the elastic buffer may again store the bit stream of the next High-Speed data packet. The restored SYNC bits preceding the High-Speed data packet alleviates the burden placed on the intended receiver of the High-Speed data packet of having to lock to the bit stream using less than a full complement of SYNC bits. The removed dribble bits following the High-Speed data packet also alleviates the burden on the intended receiver of having to ignore the dribble bits to avoid misinterpreting the dribble bits as a new packet.

The serial interface engine 132 may monitor activities on the eUSB2 and USB2 ports to decode bus events and trigger appropriate action. The serial interface engine 132 may decode bus events to trigger repeater state machine 130 and to control the data path of packets through the High-Speed serial repeater 134. For example, the serial interface engine 132 may determine the speed of the receiver (e.g., High-Speed, Full-Speed, or Low-Speed), detect configuration of the eUSB2 and USB2 ports, monitor the state of the data lines of the host or device, etc., to enable the repeating and retiming functionality of the High-Speed serial repeater 134.

The repeater state machine 130 may receive decoded bus events from the serial interface engine 132 and internal states of the High-Speed serial repeater 134 to control the operation of the High-Speed serial repeater 134 including operation to regenerate the lost SYNC bits and to remove the dribble bits of High-Speed data packets. The repeater state machine 130 may also control the states of the eUSB repeater subsystem 124 to implement the states compliant with the eUSB specification.

Figure 3:
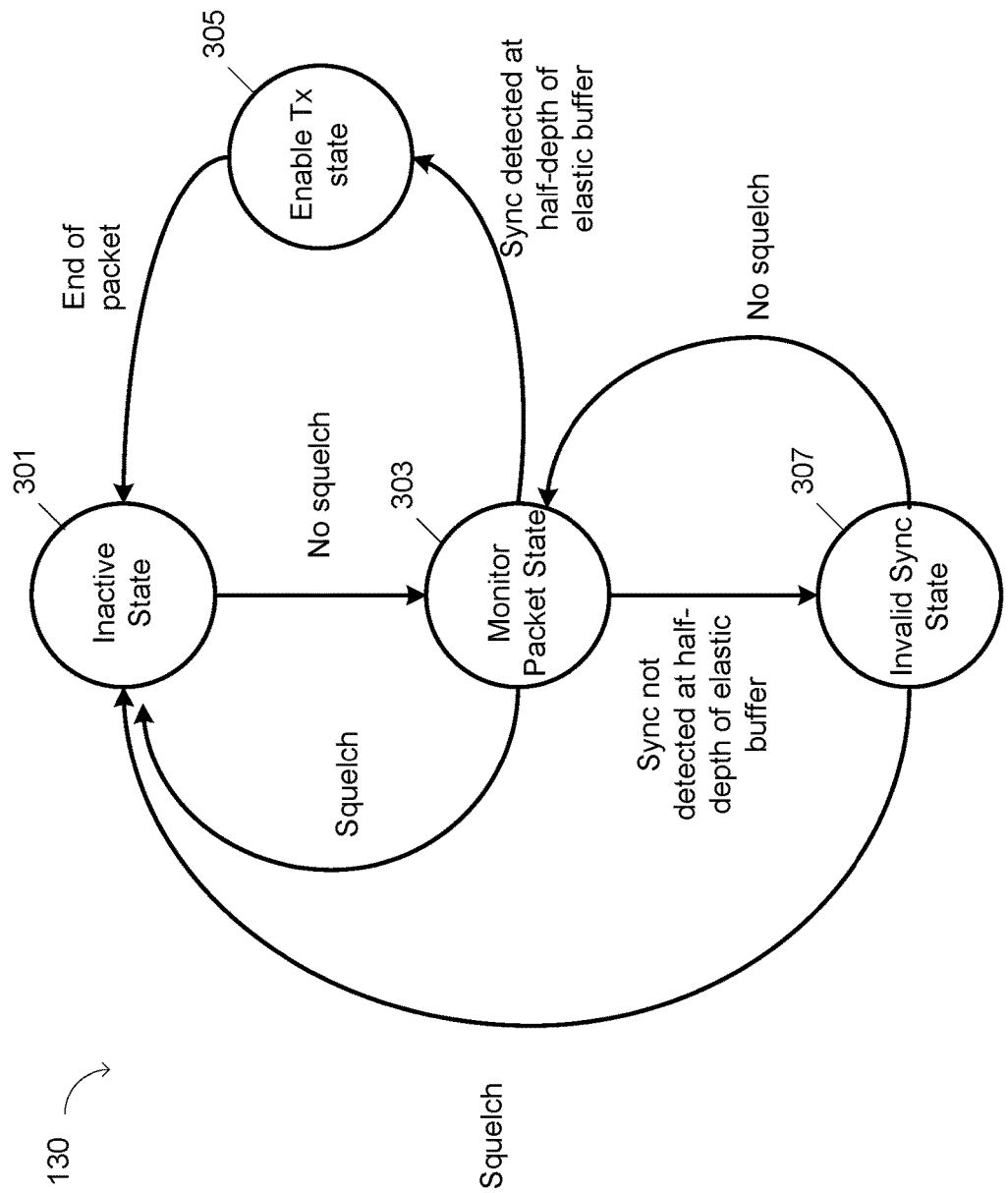
FIG. 3 illustrates operation of a repeater state machine of the eUSB repeater subsystem, in accordance with one aspect of the present disclosure.

FIG. 3 illustrates the operation of the repeater state machine 130 of the eUSB repeater subsystem 124, in accordance with one aspect of the present disclosure. At state 301, the repeater state machine 130 is in the inactive state when there is no data on the differential data lines DP and DM. For example, the repeater state machine 130 may be in the inactive state 301 when the transmission envelope detector produces a squelch signal indicating there is less than 100 uV between the differential data lines of the eUSB2 PHY 126.

When there is activity on the data lines as indicated by the absence of squelch signal, such as when the transmission envelope detector detects more than 100 uV between the differential data lines of the eUSB PHY 126, the repeater state machine 130 transitions to the monitor packet state 303. In the monitor packet state 303, the High-Speed serial repeater 134 continues to monitor activities on the data lines and may store the bit stream of data detected by the eUSB PHY 126 into the elastic buffer. The data may be the SYNC bits of a High-Speed data packet. However, when the squelch signal is seen before the elastic buffer reaches its half depth or a pre-configured threshold, the repeater state machine 130 transitions back to the inactive state 301. This may occur when noise on the data lines was misinterpreted as data activity to cause the repeater state machine 130 to briefly transition from the inactive state 301 to the monitor packet state 303.

When the elastic buffer reaches its half depth or a pre-configured threshold and the beginning of the High-Speed SYNC pattern has been identified from the elastic buffer, the repeater state machine 130 transitions to the enable Tx state 305 from the monitor packet state 303. In the enable Tx state 305, the High-Speed serial repeater 134 transmits a SYNC bit for each SYNC bit read from the elastic buffer. If the number of SYNC bits received is less than a programmable number, the High-Speed serial repeater 134 may regenerate SYNC bits that were lost to transmit the programmable number of SYNC bits of the High-Speed Sync pattern. The High-Speed serial repeater 134 may then read from the elastic buffer to transmit the payload followed by the EOP bits. If the EOP bits read from the elastic buffer includes any dribble bits following the EOP pattern, the High-Speed serial repeater 134 may disable the transmission of the dribble bits. At the completion of transmission of the EOP pattern, the repeater state machine 130 returns to the inactive state 301 to wait for the next High-Speed data packet.

If, at the monitor packet state 303, the elastic buffer reaches its half depth or the pre-configured threshold but the beginning of the High-Speed SYNC pattern has not been identified, the repeater state machine 130 transitions to the invalid sync state 307. This may be because the SYNC bits have been corrupted, there are activities on the data lines other than data packets, etc. In the invalid sync state 307, if there is an absence of the squelch signal, indicating continuing activity on the data lines, the repeater state machine 130 transitions back to the monitor packet state 303 to continue to monitor activities on the data lines and to store the received bit stream into the elastic buffer. If a squelch signal is detected at the invalid sync state 307, the repeater state machine 130 returns to the inactive state 301 to wait for the next High-Speed data packet.

Figure 4A:
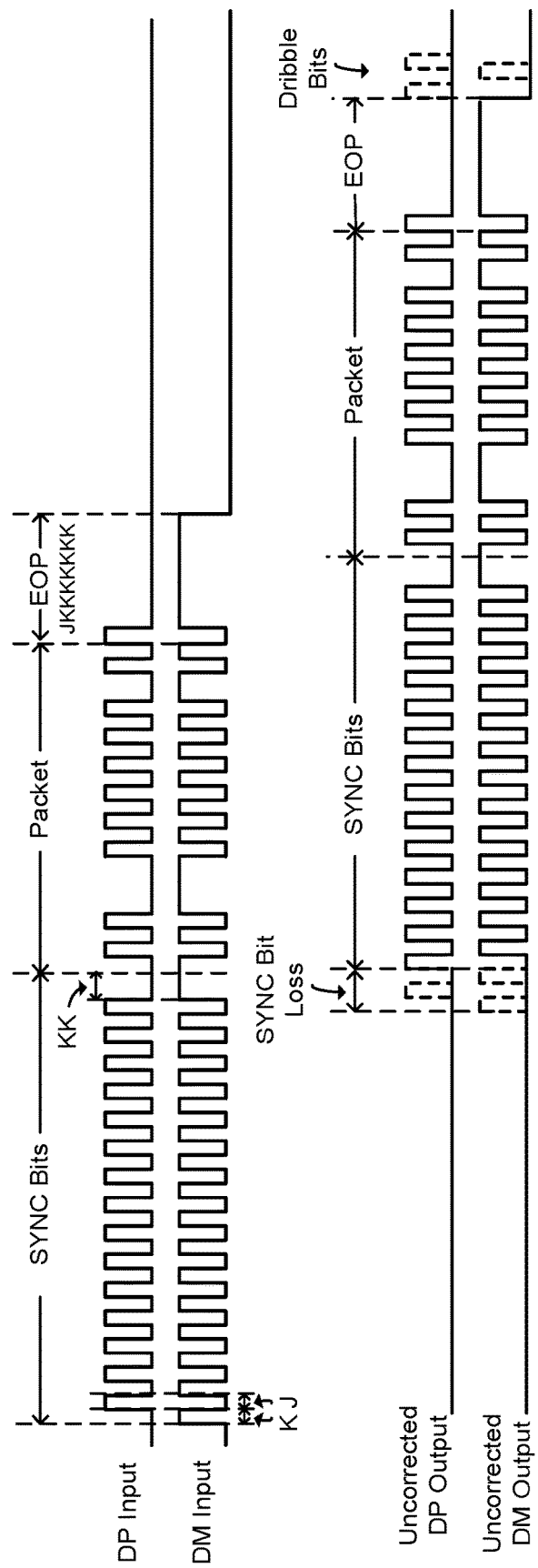
FIG. 4A illustrates a High-Speed repeater losing SYNC bits at the beginning of a High-Speed data packet and inserting dribble bits after the end of the packet due to squelch delay of the envelope transmission detector.

FIG. 4A illustrates a High-Speed repeater losing SYNC bits at the beginning of a High-Speed data packet and inserting dribble bits after the end of the packet due to squelch delay of the envelope transmission detector. The DP and DM inputs are both initially at a low level in a state referred to as single-ended zero (SE0) to indicate an idle state. The SYNC pattern for the High-Speed data packet is specified as a 32-bit sequence of 15 pairs of KJ followed by KK, where K denotes a low level on the DP input and a high level on the DM input, and J denotes a high level on the DP input and a low level on the DM input. USB2 encodes data using the Non-Return-to-Zero-Inversion (NRZI) encoding in which a transmitted '1' bit is represented by no level transition on the DP/DM inputs and a '0' bit is represented by a level transition on the DP/DM inputs. The SYNC pattern allows the transmission envelope detector to perform clock and data recovery to lock to the bit streams of the High-Speed data packet.

After the SYNC pattern comes the bit stream of the payload of the High-Speed data packet. An EOP byte pattern of 1 '0' followed by 7 '1s' indicates the end of the packet. The EOP byte pattern may be encoded by 'JKKKKKKK' on the DP/DM inputs as shown. The EOP pattern is chosen because when there is a run of more than 6 '1's' in a row in the payload, a '0' is automatically inserted for transmission, which will be removed on reception. This bit stuffing technique helps to ensure there are sufficient transitions on the NRZI encoded data stream to allow clock recovery. Thus the EOP byte represents a bit-stuffing error that should not be associated with the payload and may be used to indicate the EOP. After the EOP byte, the DP/DM inputs return to the SE0 state.

Due to the inherent delay of the envelope transmission detector, the High-Speed repeater may lose bits at the beginning of the SYNC pattern and may insert dribble bits after the EOP. If uncorrected, the intended receiver of the High-Speed data packet may receive less than the full SYNC pattern or may misinterpret the dribble bits as a new packet. FIG. 4A shows the DP/DM outputs from the High-Speed repeater missing the first three bits (KJK) of the SYNC pattern due to SYNC bit loss and adding three dribble bits (JKJ) after the EOP.

Figure 4B:
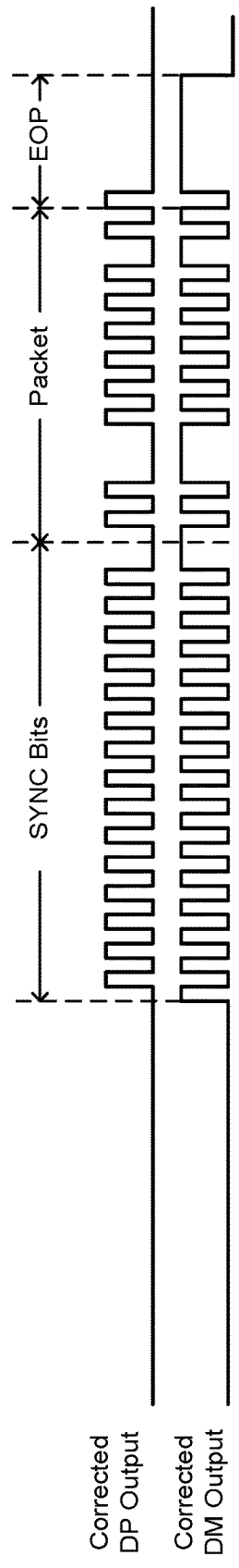
FIG. 4B illustrates the High-Speed repeater regenerating SYNC bits at the beginning of the High-Speed data packet and removing dribble bits after the end of the packet to remedy the corrupted bit stream of FIG. 4A, in accordance with one aspect of the present disclosure.

FIG. 4B illustrates the High-Speed repeater regenerating SYNC bits at the beginning of the High-Speed data packet and removing dribble bits after the end of the packet to remedy the corrupted bit stream of FIG. 4A, in accordance with one aspect of the present disclosure. The High-Speed repeater regenerates the first three bits (KJK) of the SYNC pattern and removes the three dribble bits (JKJ) after the EOP so that the bit stream of the High-Speed data packet transmitted by the High-Speed repeater at the DP/DM outputs is a time-delayed version of the packet received by the DP/DM inputs. In one aspect, the number of SYNC bits transmitted by the High-Speed repeater may be a programmable number other than the 32 bits of the full SYNC pattern. The programmable number may be implemented, for example, as a value stored in a programmable (e.g., firmware) register that can be accessed and programmed through an IC interface of repeater 100.

Figure 5:
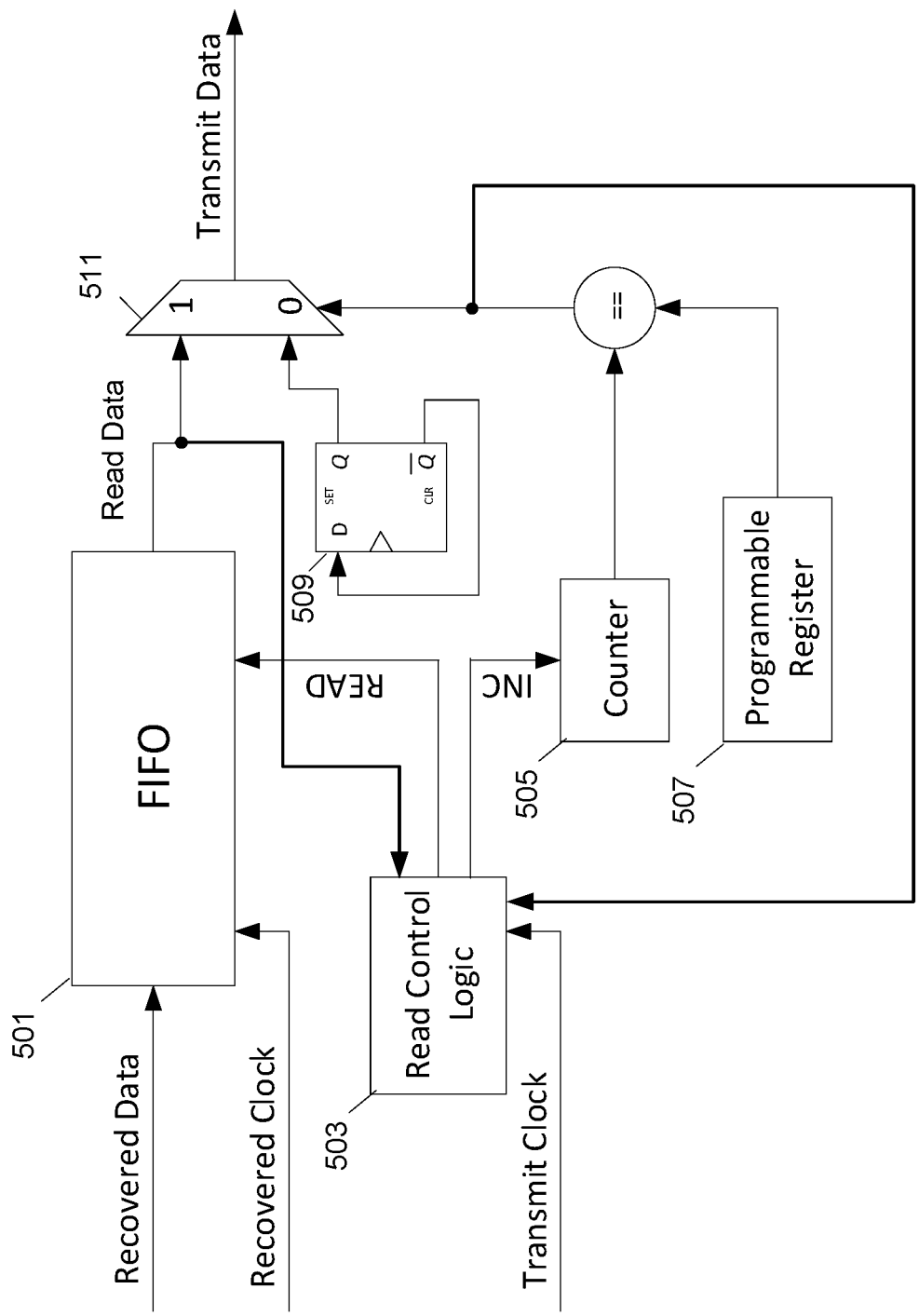
FIG. 5 is a block diagram of a module of a repeater used to regenerate SYNC bits of a High-Speed data packet, in accordance with one aspect of the present disclosure.

FIG. 5 is a block diagram of a module of a repeater used to regenerate SYNC bits of a High-Speed data packet, in accordance with one aspect of the present disclosure. The module may be part of the High Speed serial repeater 134 of FIG. 2. A FIFO 501, which may also be referred to as an elastic buffer, may store the data detected on the DP/DM inputs by the envelope transmission detector of the eUSB PHY 126 when there is activity detected on the DP/DM inputs. The FIFO 501 may serially store the bit stream using the clock recovered from the DP/DM inputs. In one aspect, the recovered clock may run at 480 MHz to enable the High-Speed data rate of 480 Mbits/s. Starting from the idle state of the input DP/DM, the FIFO 501 may store the SYNC bits of a High-Speed data packet when there is activity on the data lines.

When the FIFO 501 is half full, a read control logic 503 may begin to read out the FIFO 501 for transmission. In one aspect, transmission may begin when the number of bits in the FIFO 501 reaches a pre-configured threshold. In one aspect, the read control logic 503 may verify that the bit read from the FIFO 501 is a SYNC bit prior to transmission. The read control logic 503 may serially read out the data based on a transmit clock. In one aspect, the transmit clock may run at the same frequency as the recovered clock to transmit the data at the High-Speed data rate of 480 Mbits/s. For every bit read from the FIFO 501, the read control logic 503 may increment a counter 505 to count the number of received SYNC bits.

The counter 505 is compared against a programmable register 507. The programmable register 507 may specify the number of SYNC bits to transmit. In one aspect, the programmable register 507 may contain a value of 32 to specify transmission of the full SYNC pattern. In one aspect, the programmable register 507 may be less than 32 and more than 12 to provide for transmission of a partial SYNC pattern that is still longer than the expected length of the received SYNC bits. For every bit read from the FIFO 501 that does not indicate the end of the SYNC pattern (i.e., 'KK' state) and the counter 505 is less than the programmable register 507, a SYNC bit may be generated by the toggle flip-flop 509 and transmitted through mux 511. The toggle flip-flop 509 generates the alternating 'KJ' states of the SYNC pattern for the transmit data.

If the bit read from the FIFO 501 indicates the end of the SYNC pattern (another 'K' state following a 'K' state instead of a 'J' state following the 'K') and the counter 505 has not reached the number of SYNC bits to transmit in the programmable register 507, the number of SYNC bits received by the repeater is less than the specified number of SYNC bits to transmit. The read control logic 503 may halt the data read from the FIFO 501. However, the toggle flip-flop 509 may continue to generate the alternating 'KJ' bits of the SYNC pattern for transmission and the counter 505 may continue to increment to count the number of SYNC bits transmitted. When the counter 505 reaches the programmable register 507, the read control logic 503 may resume reading the rest of the High-Speed data packet from the FIFO 501. The repeater may switch the mux 511 to select the end of the SYNC pattern and the bit stream of the payload read from the FIFO 501 for transmission. The repeater thus regenerates the lost SYNC bits until the number of SYNC bits specified by the programmable register 507 is transmitted. During the interval when the data read from the FIFO 501 is stopped to regenerate the lost SYNC bits, the FIFO 501 continues to store the bit stream of the High-Speed data packet received from the eUSB PHY 126. The FIFO 501 may be sized to accommodate the maximum number of bits received during this interval. In one aspect, the maximum number of bits received during this interval, which is also the maximum number of lost SYNC bits regenerated, may be between 12-32.

If the counter 505 reaches the number of SYNC bits to transmit in the programmable register 507 before the end of the SYNC pattern is read from the FIFO 501, the number of SYNC bits received by the repeater is more than the specified number of SYNC bits to transmit. The data read from the FIFO 507 may continue, the toggle flip-flop 509 may continue to generate the bits of the SYNC pattern to transmit, and the counter 505 may continue to increment to count the number of received and transmitted SYNC bits until the end of the SYNC pattern is read. When the end of the SYNC pattern is read from the FIFO 507, the repeater may switch the mux 511 to transmit the end of the SYNC pattern and the bit stream of the payload of the High-Speed data packet read from the FIFO 501. The repeater may thus transmit all of the received SYNC bits if the number of SYNC bits received is more than the specified number of SYNC bits to transmit.

If the counter 505 reaches the number of SYNC bits to transmit in the programmable register 507 when the end of the SYNC pattern is read from the FIFO 501, the number of SYNC bits received by the repeater is the same as the specified number of SYNC bits to transmit. The repeater may switch the mux 511 to transmit the end of the SYNC pattern and the bit stream of the payload of the High-Speed data packet read from the FIFO 501.

Figure 6:
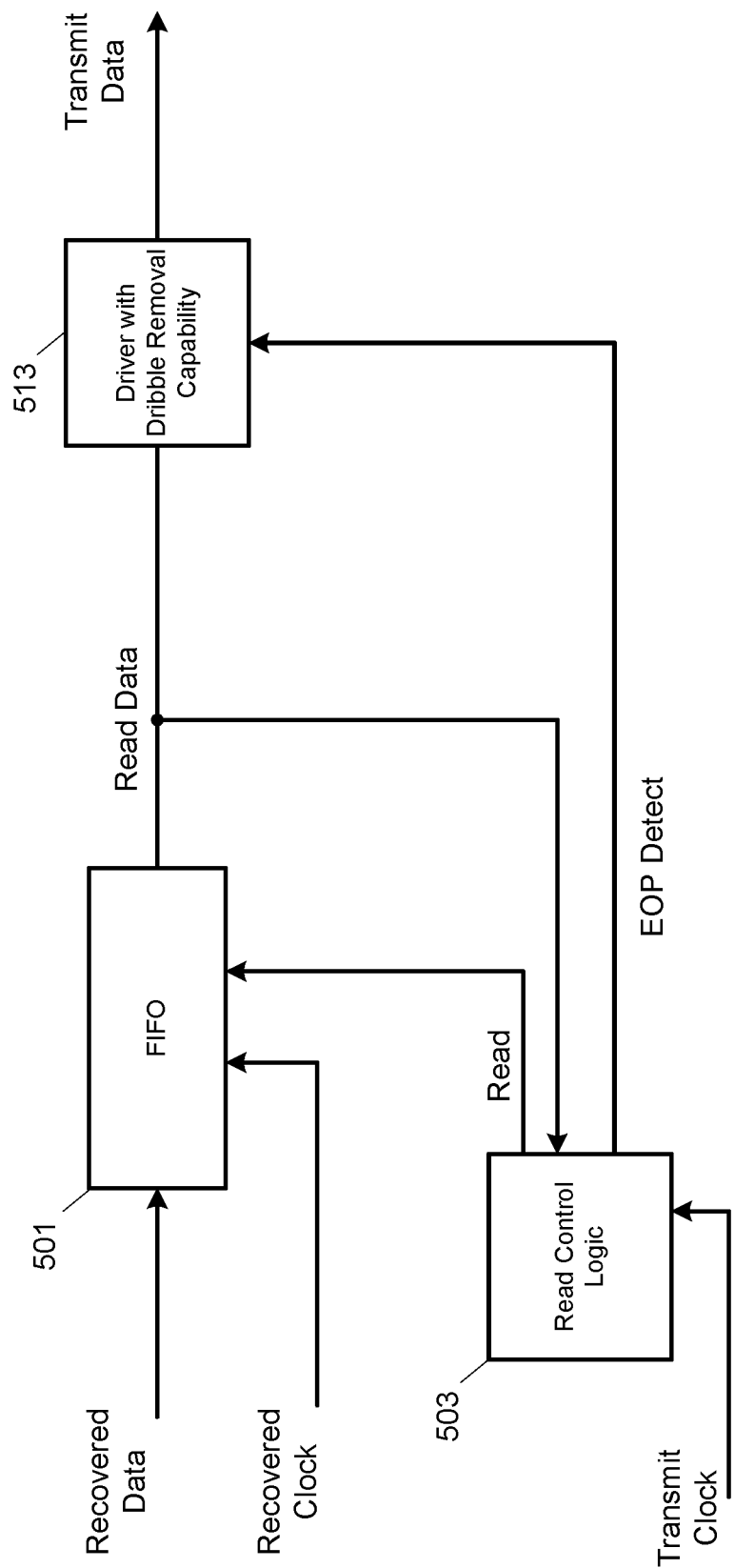
FIG. 6 is a block diagram of a module of a repeater used to remove dribble bits of a High-Speed data packet, in accordance with one aspect of the present disclosure.

FIG. 6 is a block diagram of a module of a repeater used to remove dribble bits of a High-Speed data packet, in accordance with one aspect of the present disclosure. The module may be part of the High Speed serial repeater 134 of FIG. 2. As in FIG. 5, a FIFO 501, may serially store the bit stream of a High-Speed data packet detected on the DP/DM inputs by the envelope transmission detector of the eUSB PHY 126. The FIFO 501 may serially store the bit stream using the clock recovered from the DP/DM inputs.

The read control logic 503 may serially read out the FIFO 501 for transmission using the transmit clock. The repeater may transmit the payload of the High-Speed data packet read from the FIFO 501 through a driver 513 with dribble removal capability. The read control logic 503 may monitor the read data from the FIFO 501 for the EOP byte pattern (e.g., 'JKKKKKKK' pattern). When the EOP byte pattern is detected, the read control logic 503 may generate an EOP detect signal. The driver 513 may receive the EOP detect signal to remove any dribble bits after the EOP. In one aspect, dribble bits may continue to be read out from the FIFO 501 after the EOP is detected until there are no more data in the FIFO 501 or until the SYNC pattern of the next High-Speed data packet is detected. The driver 513 may prevent transmission of the dribble bits following the EOP byte pattern for this duration. In one aspect, the driver 513 may drive the DP/DM lines of the transmit data port to SE0 (e.g., idles state) after transmission of the EOP pattern to prevent the transmission of the dribble bits.

In various embodiments, the driver 513 may be implemented as hardware logic that includes suitable digital and/or analog components. In one aspect, the driver 513 may prevent the transmission of the dribble bits for a minimum time interval between successive High-Speed data packets or for a programmable number of transmit clocks to ensure all the dribble bits are stripped from the transmitted data. However, for isochronous packets, a 1-bit bit-stuffing error may be interpreted as an EOP byte pattern and may result in a packet loss when one or more bits following the 1-bit bit-stuffing error are stripped. In one aspect, the driver 513 may look for the header in isochronous packets to distinguish between a 1-bit bit-stuffing error and an EOP and to prevent the removal of data bits following a 1-bit bit-stuffing error.

Figure 7:
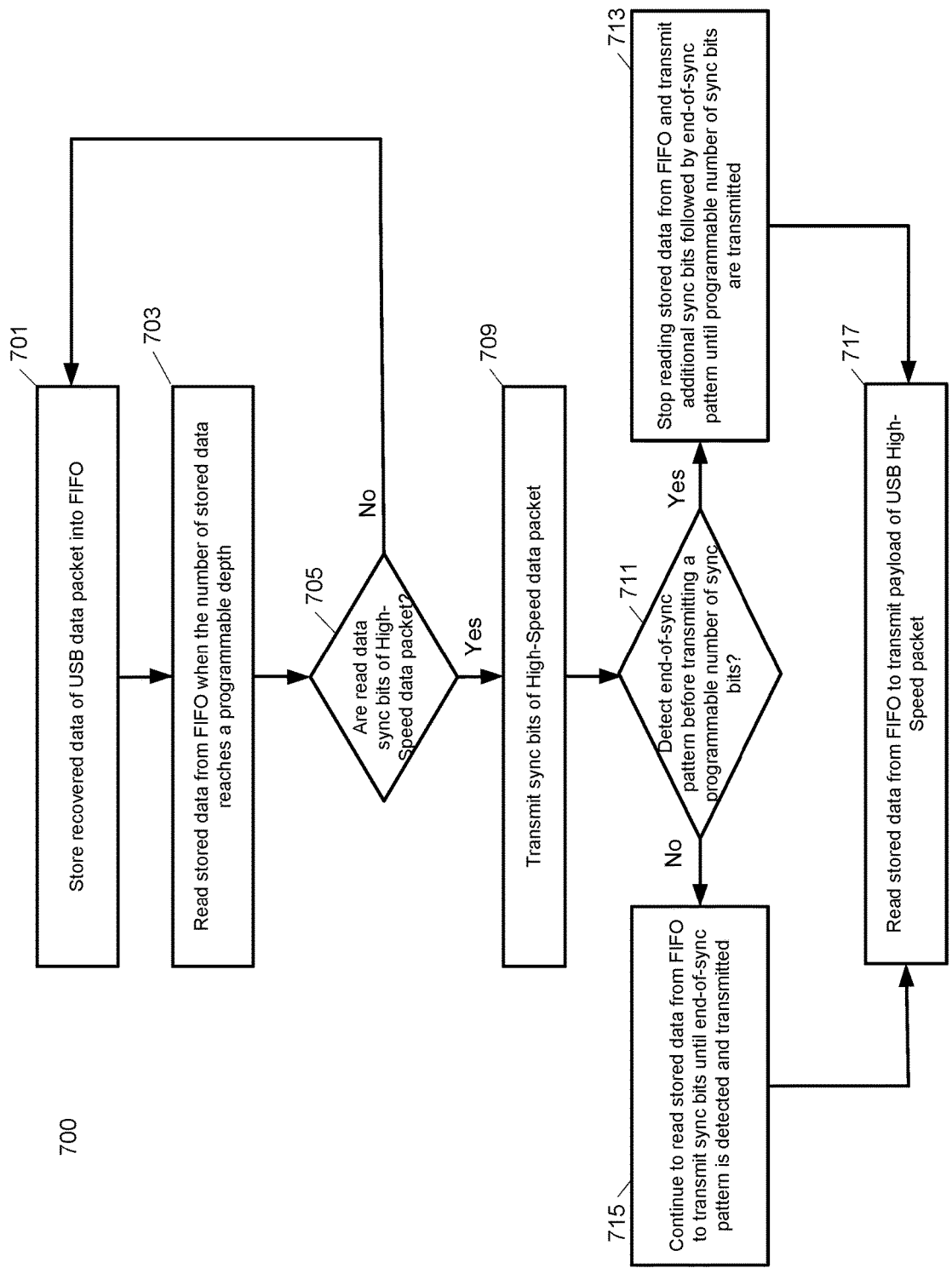
FIG. 7 is a flow diagram of a method for regenerating SYNC bits of a High-Speed data packet due to squelch delay, in accordance with one aspect of the present disclosure.

FIG. 7 is a flow diagram of a method 700 for regenerating SYNC bits of a High-Speed data packet due to squelch delay, in accordance with one aspect of the present disclosure. In an example embodiment, the method 700 may be performed by the High-Speed serial repeater 134 of FIG. 2 or the repeater of FIG. 5. In another example embodiment, the method 700 may be performed by a repeater that performs the described operations in a parallel fashion. In one aspect, the method 700 may be performed utilizing hardware logic, or combinations of hardware logic and programmable registers that store configuration values.

At operation 701, a High-Speed repeater serially stores USB data recovered from the DP/DM inputs into a FIFO. The recovered data may represent the bit stream of a High-Speed data packet including the SYNC pattern, the payload, and the EOP pattern when there is activity on the data lines (e.g., no squelch) such as when the transmission envelope detector of the repeater detects active data of a High-Speed data packet. The data may be stored using a High-Speed clock of 480 MHz recovered from the DP/DM inputs.

At operation 703, the repeater serially reads the stored data from the FIFO when the number of data in the FIFO reaches a programmable threshold. In one aspect, the programmable threshold may be the half-depth of the FIFO. In one aspect, the FIFO data may be read out based on a transmit clock running at the High-Speed clock frequency of 480 MHz.

At operation 705, the repeater determines if the read data from the FIFO represents the bits of the SYNC pattern of a High-Speed data packet. If not, the repeater serially stores additional USB data recovered from the DP/DM inputs into the FIFO at operation 701.

At operation 709, if the read data from the FIFO represents the bits of the SYNC pattern of a High-Speed data packet, the repeater transmits the bits of the SYNC pattern at the High-Speed clock frequency of 480 MHz. The transmitted bits may be the alternating 'KJ' states of the SYNC pattern. Due to the inherent delay of the repeater in recovering the SYNC bits of the beginning of the SYNC pattern, the number of received SYNC bits stored in the FIFO may be less than the full 32-bit SYNC pattern of the High-Speed data packet.

At operation 711, the repeater determines if the end of the SYNC pattern of the 'KK' state is read from the FIFO before a programmable number (e.g., as stored in a programmable register) of SYNC bits have been read from the FIFO and transmitted. In one aspect, the programmable number of SYNC bits may be 32 to specify transmission of the full SYNC pattern. In one aspect, the programmable number of SYNC bits may be less than 32 and more than 12 to specify transmission of a partial SYNC pattern that is still longer than the expected length of the received SYNC bits.

At operation 713, if the end of the SYNC pattern is read from the FIFO before the programmable number of SYNC bits have been read and transmitted, the repeater stops reading the stored data from the FIFO to regenerate the missing SYNC bits (e.g., alternating 'KJ' states of the SYNC pattern). Operation 713 transmits the additional SYNC bits followed by the end of the SYNC pattern until the programmable number of SYNC bits have been transmitted. The repeater thus transmits the programmable number of SYNC bits even though the number of SYNC bits received is less than the programmable number. During the time when the data reading from the FIFO is stopped to regenerate the missing SYNC bits, the FIFO may continue to store the rest of the High-Speed data packet.

At operation 715, if the programmable number of SYNC bits have been read from the FIFO before the end of the SYNC pattern is read, the repeater continues to transmit the SYNC bits read from the FIFO until the end of the SYNC pattern is read and transmitted. The repeater thus transmits all of the received SYNC bits if the number of received SYNC bits is equal to or greater than the programmable number of SYNC bits.

At operation 717, the repeater reads the data stored in the FIFO to transmit the bit stream of the payload of the High-Speed data packet.

Figure 8:
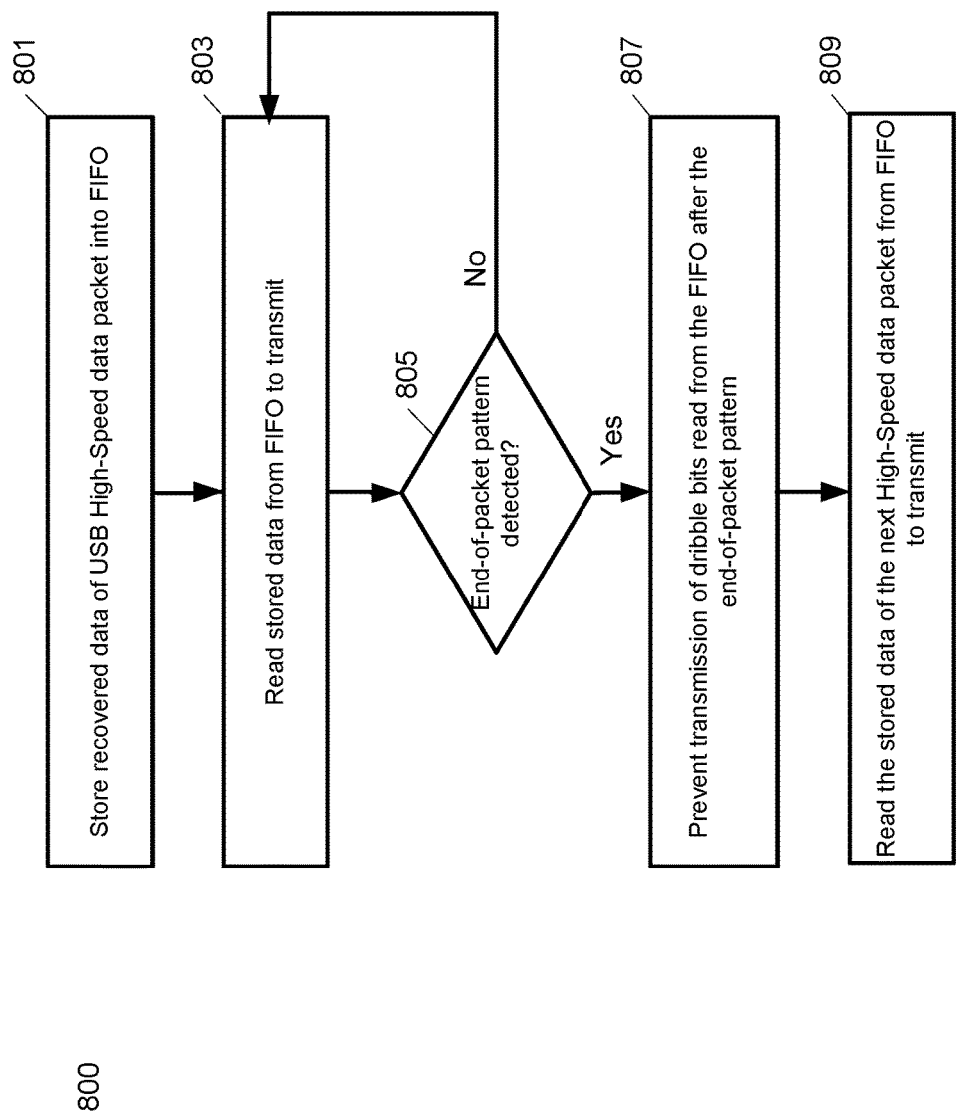
FIG. 8 is a flow diagram of a method for removing dribble bits of a High-Speed data packet due to squelch delay, in accordance with one aspect of the present disclosure.

FIG. 8 is a flow diagram of a method 800 for removing dribble bits of a High-Speed data packet due to squelch delay, in accordance with one aspect of the present disclosure. In an example embodiment, the method 800 may be performed by the High-Speed serial repeater 134 of FIG. 2 or the repeater of FIG. 6. In one aspect, the method 800 may be performed utilizing hardware logic, or combinations of hardware logic and programmable registers that store configuration values.

At operation 801, a High-Speed repeater serially stores USB data recovered from the DP/DM inputs into a FIFO. The recovered data may represent the bit stream of a High-Speed data packet including the SYNC pattern, the payload, and the EOP pattern when there is activity on the data lines (e.g., no squelch) such as when the transmission envelope detector of the repeater detects active data of a High-Speed data packet. The data may be stored using a High-Speed clock of 480 MHz recovered from the DP/DM inputs.

At operation 803, the repeater serially reads the stored data from the FIFO to transmit. In one aspect, the FIFO data may be read out based on a transmit clock running at the High-Speed clock frequency of 480 MHz when the number of data stored in the FIFO reaches a programmable threshold.

At operation 805, the repeater determines if the read data from the FIFO indicates the EOP byte pattern of a High-Speed data packet. The EOP byte pattern may be 1 '0' followed by 7 continuous '1s' to distinguish over the payload, which should not have a run of more than 6 continuous 1's due to bit stuffing. The EOP byte pattern may be encoded by 'JKKKKKKK' on the DP/DM inputs. In one aspect, the EOP byte pattern may be 7 continuous '0s' followed or preceded by a '1'. Due to the inherent delay of the envelope transmission detector of the repeater, there may be dribble bits in the recovered data stored into the FIFO after the EOP byte pattern. If the read data from the FIFO is not the EOP byte pattern, the repeater continues to read the stored data from the FIFO to transmit in operation 803.

At operation 807, if the read data from the FIFO is the EOP byte pattern, the repeater prevents the transmission of dribble bits read from the FIFO after the EOP byte pattern. In one aspect, operation 807 may detect dribble bits read from the FIFO to prevent the transmission for the duration of the dribble bits. In one aspect, operation 807 may stop further transmission of data bits until the detection envelope detector detects active data again. In one aspect, operation 807 may prevent the transmission of a programmable number (e.g., as stored in a programmable register) of dribble bits instead of preventing the transmission of all dribble bits after transmitting the EOP byte pattern, thus potentially allowing for the transmission of a few dribble bits. The programmable number of dribble bits may be the maximum number of dribble bits inserted by the envelope transmission detector of the repeater. In one aspect, the programmable number of dribble bits may be the maximum number of dribble including the dribble bits inserted by other intervening devices (e.g., such as hubs) between the transmitter and the repeater and the dribble bits inserted by the repeater. In one aspect, the programmable number of dribble bits may be the minimum clock cycles between the EOP of a High-Speed data packet and the SYNC pattern of the next High-Speed data packet.

In one aspect, for isochronous packets, a 1-bit bit-stuffing error may be interpreted as an EOP byte pattern and may result in a packet loss when the programmable number of data bits following the 1-bit bit-stuffing error are not transmitted. In one aspect, the operation 807 may look for the header in isochronous packets to distinguish between a 1-bit bit-stuffing error and an EOP and to maintain the transmission of the bits following the 1-bit bit-stuffing error.

At operation 809, the repeater resumes read of the FIFO to read the stored data of the next High-Speed data packet from the FIFO for transmission.

Various embodiments of the USB repeater subsystem described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular computer or other apparatus. Various systems (e.g., such as USB hubs and docking stations) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    recovering, by a Universal Serial Bus compliant (USB-compliant) repeater, a USB High-Speed data packet received at a first port to generate a recovered bit stream;
    transmitting the recovered bit stream at a second port;
    monitoring the recovered bit stream to detect an end-of-packet (EOP) pattern; and
    preventing transmitting one or more dribble bits of the recovered bit stream following the EOP pattern at the second port in response to detecting the EOP pattern.

2. The method of claim 1, wherein the USB High-Speed data packet comprises a synchronization (SYNC) pattern used by the USB-compliant repeater to detect the USB High-Speed data packet, and wherein transmitting the recovered bit stream at the second port comprises:
    transmitting the recovered bit stream when the recovered bit stream indicates a plurality of bits of the SYNC pattern is received.

3. The method of claim 1, wherein the EOP pattern comprises an encoding of 7 consecutive 1s or 7 consecutive 0s of data bits on the recovered bit stream.

4. The method of claim 1, wherein preventing transmitting the one or more dribble bits of the recovered bit stream comprises:
    detecting a duration of the one or more dribble bits on the recovered bit stream following the EOP pattern; and
    preventing transmitting the one or more dribble bits for the detected duration.

5. The method of claim 1, wherein preventing transmitting the one or more dribble bits of the recovered bit stream comprises:
    preventing transmitting the one or more dribble bits following the EOP pattern until a next USB High-Speed data packet is indicated by the recovered bit stream.

6. The method of claim 1, wherein preventing transmitting the one or more dribble bits of the recovered bit stream comprises:
    preventing transmitting a programmable number of bits of the recovered bit stream following the EOP pattern.

7. The method of claim 1, further comprising:
    distinguishing between the EOP pattern and a bit-stuffing error in the recovered bit stream to continue transmitting the recovered bit stream following the EOP pattern at the second port.

8. The method of claim 7, wherein distinguishing between the EOP pattern and the bit-stuffing error comprises detecting a header of an isochronous USB High-Speed data packet.

9. The method of claim 1, wherein preventing transmitting the one or more dribble bits of the recovered bit stream comprises:
    driving the second port to an idle state.

10. The method of claim 1, wherein preventing transmitting the one or more dribble bits of the recovered bit stream comprises:
    detecting that the recovered bit stream following the EOP pattern represents non-dribble bits; and
    continuing transmitting the recovered bit stream following the EOP pattern.

11. A Universal Serial Bus (USB) device, comprising:
    a first physical layer logic (PHY) configured to receive a USB High-Speed data packet to generate a recovered bit stream;
    an elastic buffer configured to store the recovered bit stream;
    a second PHY configured to transmit the recovered bit stream read from the elastic buffer;
    a repeater subsystem configured to:
        read the recovered bit stream stored in the elastic buffer;
        monitor the recovered bit stream to detect an end-of-packet (EOP) pattern; and
        prevent a transmission of one or more dribble bits of the recovered bit stream following the EOP pattern from the second PHY in response to the detected EOP pattern.

12. The USB device of claim 11, wherein the USB High-Speed data packet comprises a synchronization (SYNC) pattern used by the first PHY to detect the USB High-Speed data packet, and wherein the repeater subsystem is further configured to:
    enable the second PHY to transmit the recovered bit stream when the recovered bit stream read from the FIFO indicates a plurality of bits of the SYNC pattern is received.

13. The USB device of claim 11, wherein the EOP pattern comprises an encoding of 7 consecutive 1s or 7 consecutive 0s of data bits on the recovered bit stream.

14. The USB device of claim 11, wherein to prevent the transmission of one or more dribble bits of the recovered bit stream, the repeater subsystem is configured to:
    detect a duration of the one or more dribble bits on the recovered bit stream following the EOP pattern; and
    prevent the transmission of the one or more dribble bits for the detected duration.

15. The USB device of claim 11, wherein to prevent the transmission of the one or more dribble bits of the recovered bit stream, the repeater subsystem is configured to:
    prevent the transmission of the one or more dribble bits following the EOP pattern until a next USB High-Speed data packet is indicated by the recovered bit stream.

16. The USB device of claim 11, wherein to prevent the transmission of one or more dribble bits of the recovered bit stream, the repeater subsystem is configured to:

prevent the transmission of a programmable number of bits of the recovered bit stream following the EOP pattern.

17. The USB device of claim 11, wherein the repeater subsystem is further configured to:
distinguish between the EOP pattern and a bit-stuffing error in the recovered bit stream to continue a transmission of the recovered bit stream following the EOP pattern at the second PHY.

18. The USB device of claim 17, wherein the repeater subsystem is further configured to detect a header of an isochronous USB High-Speed data packet to distinguish between the EOP pattern and a bit-stuffing error in the recovered bit stream.

19. The USB device of claim 11, where to prevent the transmission of one or more dribble bits of the recovered bit stream, the repeater subsystem configures the second PHY in an idle state.

20. The USB device of claim 11, wherein the second PHY is compliant with USB 2.0 (USB2) and the first PHY is compliant with an embedded version of USB2 (eUSB2).

* * * * *